United States Patent [19]

Leistner

[11] 4,323,802
[45] Apr. 6, 1982

[54] BUNDLE OF LAMINATIONS FOR AN ELECTRIC MACHINE

[75] Inventor: Werner Leistner, Berlin, Fed. Rep. of Germany

[73] Assignee: Siemens Aktiengesellschaft, Berlin and Munich, Fed. Rep. of Germany

[21] Appl. No.: 133,959

[22] Filed: Mar. 25, 1980

[30] Foreign Application Priority Data

Mar. 28, 1979 [DE] Fed. Rep. of Germany ....... 2912592

[51] Int. Cl.³ .............................................. H02K 9/00
[52] U.S. Cl. ....................................... 310/59; 310/65; 310/214
[58] Field of Search ................. 310/254, 52, 60, 60 A, 310/59, 58, 64, 65, 56, 214; 336/223

[56] References Cited

U.S. PATENT DOCUMENTS 4,217,511  8/1980  King et al. ............................ 310/59

OTHER PUBLICATIONS

H. Sequenz, "Herstellung der Wicklungen electrischer Maschinen", Springer-Verlag, Wien-New York, 1973, p. 159.

Primary Examiner—J. V. Truhe
Assistant Examiner—Morris Ginsburg
Attorney, Agent, or Firm—Spellman, Joel and Pelton

[57] ABSTRACT

The bundle of laminations in an electric generator as motor contains a plurality of lamination stacks arranged in series in an axial direction and a plurality of slots in which are arranged the conductors of the machine winding. In order to improve the dissipation of the heat losses from the bundle of laminations and the winding, laminations are contained in the stacks which have a slot width greater than the width of the conductors and which have on the slot floor a recess of a greater depth. Thus side ducts are formed alongside the conductor which are in connection with the air gap of the machine, and axial cooling channels are formed on the slot floor which open at least on one side into a radial cooling channel. By reversible packing of these laminations, the position of the lateral channels can be altered.

12 Claims, 12 Drawing Figures

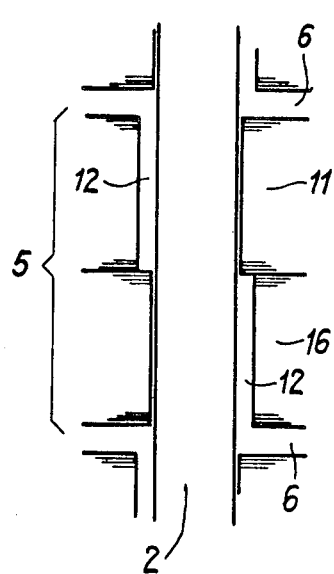
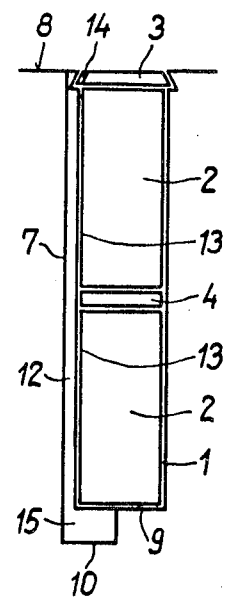
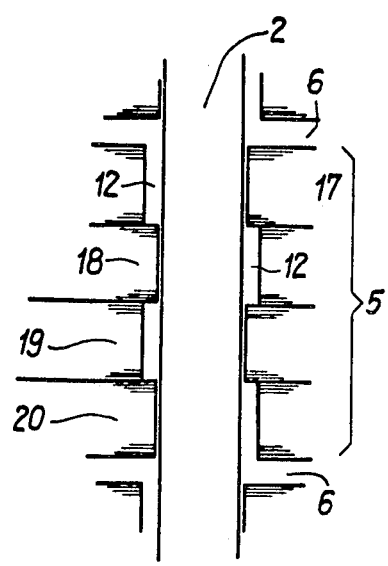
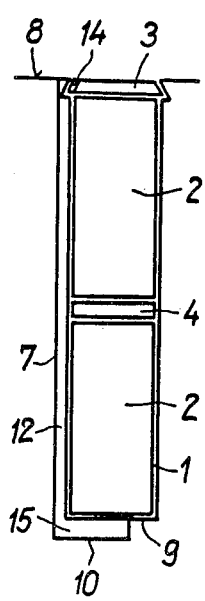

BUNDLE OF LAMINATIONS FOR AN ELECTRIC MACHINE

BACKGROUND OF THE INVENTION

The invention relates to a bundle of laminations of an electric machine. In particular the invention relates to a bundle of laminations containing several stacks of laminations arranged in series in an axial direction, between which are provided radial cooling channels and in which are arranged the conductors of the winding and shims, if necessary, held by slot wedges.

Such an electric machine is generally known. The bundle of laminations of such an electric machine is gas-cooled. This means that the losses produced in the windings in the range of the bundle of laminations and in the range of the teeth and appearing as heat are dissipated primarily through the insulation of the windings to the teeth of the bundle of laminations. They are transported from there primarily transverse to the direction of lamination of the sheets up to the cooling channel where they are absorbed by the radially flowing cooling gas. Since the heat transfer must thus overcome several obstacles, a relatively great number of radial cooling channels is required.

SUMMARY OF THE INVENTION

An object of this invention is to improve the dissipation of the heat losses from the bundle of laminations of a gas-cooled electric machine. Another object of the invention is to lower the temperatures of the conductors of the winding in the range of the bundle of laminations and that of the teeth.

Another object of the invention is to improve the heat dissipation from the bundle of laminations without decreasing considerably the magnetic cross section of the laminations.

According to the invention, in each stack of laminations arranged between two radial cooling channels there is contained a specific series arrangement of laminations. In this series arrangement, the slot width of the slot is greater than the width of the conductor or conductors contained in the slot. A recess is provided on the bottom or floor of the slot in the series arrangement. The depth of this slot is greater than corresponds to the depth of the conductor(s) with shims and slot wedge, if present. The recess extends at least over a part of the slot width up to a lateral edge of the slot. On this lateral edge the conductor(s) do(es) not bear. The laminations of the specific series arrangement are so arranged that the recesses provided at the floor of the slot form a cooling channel extending in axial direction, which opens at least on one side into a radial cooling channel.

Within the stack of laminations, that is in the laminations with slots of a greater slot width arranged in series and forming a partial stack, is thus provided a lateral channel or side duct extending in radial direction between the lateral edge of the slot and the broad side of the insulated conductors of the winding, the side duct opening into the air gap of the machine. In addition, an axially extending channel is formed on the bottom or floor of the slot. This channel is connected with the lateral channel or side duct and opens on one side or on both sides into a radial cooling channel. The gaseous coolant can thus flow from the air gap of the electric machine into the lateral channel where it passes directly over the surface of the insulation of the conductors of the winding and the slot wall. Then it enters via the axial channel on the bottom of the slot into a radial cooling channel. The major part of the losses produced in the conductors of the winding is thus absorbed directly by the cooling gas on the insulated conductor surface. The major part of the losses in the toothed iron is transported within the laminations to the lateral edge of the slot and is absorbed there by the cooling gas. Since the thermal conductivity within the laminations is much greater than the thermal conductivity transverse to the direction of lamination, the temperature rise in the tooth region remains very small. The improvement in the dissipation of the heat losses obtained by the invention thus permits to increase the distance between the radial cooling channels relative to the known design, so that the reduction of the magnetic cross section given by the lateral channels and the axial channel on the bottom of the slot can be easily compensated.

Since the insulations of the conductors of the winding nowadays used are impregnated with hardened synthetic resin and are cured accurately to measure, there is no risk by the lateral channels that the insulation will swell. However, it is expedient that in the laminations with slots of a greater slot width the conductors bear on one side on a lateral edge of the slots.

An improvement in the fastening of the conductors is achieved with advantage by arranging the laminations with slots of a greater slot width in stacks in a position turned by 180° to each other, that is, that they are alternately reversably packed. The lateral channel is thus arranged to be on the right and alternately on the left of the conductor.

It is also advisable to release the wedge slot in the range of the lateral channel in order to facilitate the entrance of the cooling gas from the air gap of the machine, provided the lateral channel is not open toward the air gap by the shape of the slot opening anyway.

The foregoing and other objects, features and advantages of the invention will be apparent from the following more particular description of a preferred embodiment of the invention, as illustrated in the accompanying drawings.

BRIEF DESCRIPTION OF THE DRAWINGS

The invention will be described below more fully on the basis of the embodiments represented in the drawings. FIGS. 1, 3, 6, 9, 10 and 12 each show in a diagram radial sections through the slots of the stator laminations of an electric machine. FIGS. 2, 4, 5, 7, 8 and 11 each show in a diagram axial sections through the slots and the lamination stack of an electric machine. The same reference numerals will be used for the same parts in all FIGS. 1 through 12.

In the drawings:

FIGS. 1 and 2 are sections of a first embodiment of a bundle of laminations having radial and axial cooling channels and side ducts for a cooling medium, according to the invention;

FIGS. 3 and 4 are sections of a second embodiment of a bundle of laminations according to the invention;

FIG. 5 is a section of a third embodiment of a bundle of laminations according to the invention;

FIGS. 6 and 7 are sections of a fourth embodiment of a bundle of laminations according to the invention;

FIG. 8 is a section of a fifth embodiment of a bundle of laminations according to the invention;

FIG. 9 is a section of a sixth embodiment of the invention which can be applied in connection with the embodiment of FIG. 8;

FIG. 10 is a section of a seventh embodiment of the invention which can be applied in connection with the embodiment of FIG. 8; and FIGS. 11 and 12 are sections of an eighth embodiment of the invention.

DESCRIPTION OF THE PREFERRED EMBODIMENTS

Figure 5:
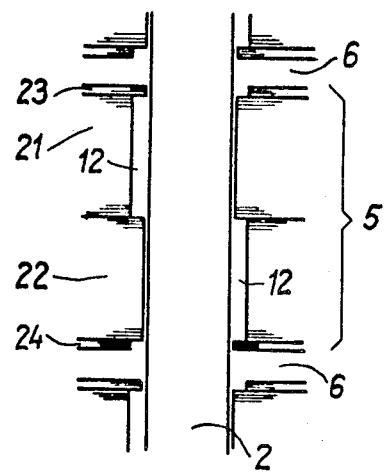

In the bundle of stator sheets or laminations of an electrical machine, two insulated conductors 2 of the stator winding are superposed in each slot 1, they are held by a slot wedge 3. Between the two conductors 2 is arranged a shim 4. The bundle of stator laminations is divided into a plurality of stacks of laminations 5 between which extend radial cooling channels 6. The stacks 5 are arranged in series in an axial direction.

In the first embodiment represented in FIGS. 1 and 2, the slots 1 punched in the laminations have a slot width greater than the width of the insulated conductors 2, and the slot opening is raised linearly to the air gap 8 of the machine on one lateral edge 7. Besides, starting from this lateral edge 7, a recess 10 is provided on the slot base or slot bottom or slot floor 9. The recess 10 extends up to the center of the slot 1. It has a greater slot depth than corresponds to the depth of conductors 2 with shim 4 and slot wedge 3. These laminations are arranged in series within the stack of laminations 5 between two radial cooling channels 6 in such a way that the conductors 2 bear in a first partial stack 11 on the right side on the slot wall (see FIG. 1). Thus, a lateral channel or side duct 12 is formed on the left side of the conductors 2 between the lateral edge 7 and the broad side 13 of the insulated conductors 2 which opens at the slot opening into the air gap 8 of the machine (see FIG. 1). At this point are also provided release mechanisms 14 in the slot wedge 3. On the slot floor 9, the recesses 10 of the first partial stack 11 form an axial cooling channel 15 on the left half of the slot 1 which opens on one side into a radial cooling channel 6.

In a second partial stack 16, the same laminations are stacked in a position turned by 180°, that is, they are reversibly packed. Here the conductors 2 bear on the left side on the slot wall, and the side duct or lateral channel 12 is to the right of the conductors 2. Likewise, the axial cooling channel 15 on the slot floor 9 is in the right half of the slot 1 and opens into another radial cooling channel 6.

Side ducts 12 and axial cooling channels 15 permit intensive elimination or dissipation of heat by means of a gaseous coolant entering from air gap 8, which passes through side duct 12 and is then conducted over the axial cooling channel 15 to a radial cooling channel 6, both from conductors 2 of the stator winding and from the teeth of the bundle of laminations.

In the second embodiment represented in FIGS. 3 and 4, the form of the laminations differs from that in the first embodiment only in that the recesses 10 on the slot floor 9 extend beyond the slot center. This means that the axial cooling channels 15 thus formed partly overlap in the individual partial stacks packed reversibly, so that the individual cooling channels 15 are interconnected and thus open on each of the end faces of the stacks of laminations 5 into a radial cooling channel 6. In this second embodiment, four partial stacks 17, 18, 19 and 20 are reversibly packed, in which the position of the lateral channel or side duct 12 changes from one conductor side to the other.

In the third embodiment according to FIG. 5, on the end faces of the stack of laminations 5 a termination of the respective side duct 12 is provided by a few (at least one) sheets 23 and 24, reversibly packed relative to the adjacent partial stack 21 and 22, respectively. In this embodiment a recess 10 extending beyond the slot center is required on the slot floor 9, as shown in FIG. 3, so that the axial cooling channel 15 formed by the recess 10 is continuous over the entire length of the stack 5. The cooling gas entering lateral channels 12 from the air gap 8 will pass over on both sides into the radial cooling channels 6.

Figure 7:
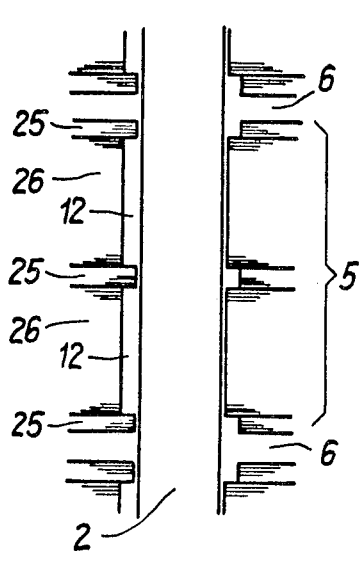
Figure 6:
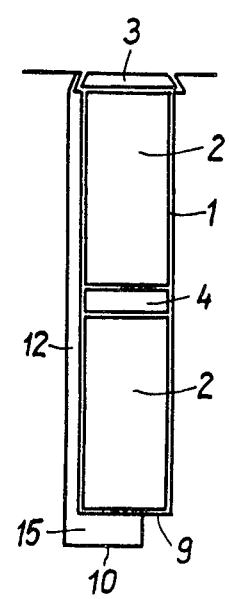

In the fourth embodiment shown in FIGS. 6 and 7, the side ducts 12 are arranged primarily on the same side of the conductors 2. Only in the center of stack 5 and on both end faces are provided small partial stacks 25. Two larger partial stacks arranged inbetween are designated by reference numeral 26. In the partial stacks 25, the sheets are reversely packed relative to the sheets provided in the larger partial stacks 26, which have slots of a greater slot width. This embodiment, too, requires that the recess 10 on the slot floor 9 extend beyond the slot center (see FIG. 6), so that overlapping axial cooling channels 15 are formed which open at both end faces of the stack 5 into the radial cooling channels 6.

Figure 8:
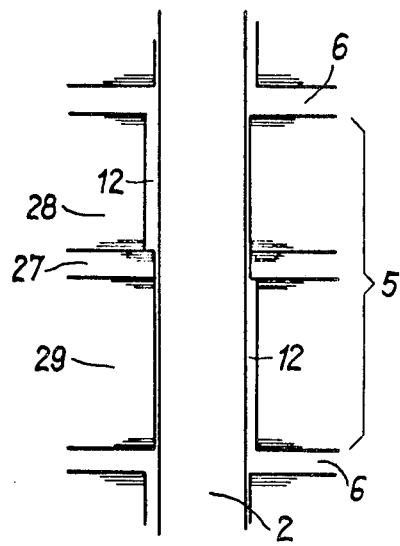

The fifth embodiment illustrated in FIG. 8 shows a possibility for a better fastening of the conductors 2 and of the slot wedge 3. A small partial stack 27 of laminations is provided in the center of each stack 5. The slot in the laminations of the partial stack 27 corresponds fully to the dimensions of conductors 2, shim 4 and slot wedge 3. Laterally thereof are again arranged larger partial stacks 28 and 29 with laminations reversibly packed with slots of greater slot width and recesses 10 on the slot floor 9, so that again side ducts 12 and axial cooling channels 15 are formed which open into the radial cooling channels 6.

Figure 9:
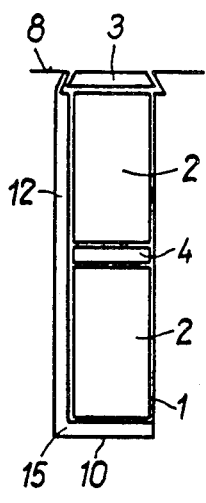

With a design of the stack of laminations 5 as shown in FIG. 8, the slot 1 in the laminations with a greater slot width may have the special aerodynamic design at the slot opening which leads to air gap 8 of the machine, as shown in FIG. 9. In this case, release mechanisms for the slot wedge 3 are not necessary, since the side duct 12 opens next to slot wedge 3 into the air gap 8. On the slot floor 9, the recess 10 extends over the entire slot width.

Figure 10:
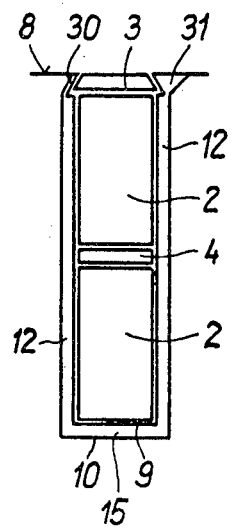

In the embodiment of FIG. 10, it is provided that slot wedges 3 and conductors 2 with shim 4 are held each by a partial stack 27 (see FIG. 8) of sheets with slots which correspond to their dimensions. As can be seen in FIG. 10, the laminations with slots of a greater slot width can be so designed that lateral channels or side ducts 12 are formed on both sides of the conductors 2, which open with an opening 30 and 31, respectively, designed according to aerodynamic principles, in a favorable manner next to slot wedge 3 into the air gap 8. The recess 10 on the slot floor 9 extends likewise over the entire slot width.

Figure 11:
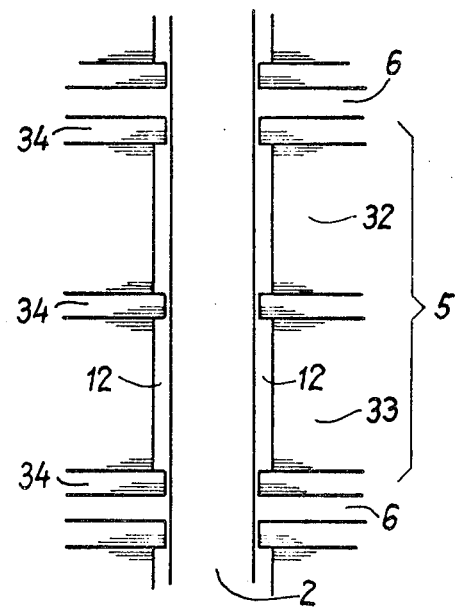
Figure 12:
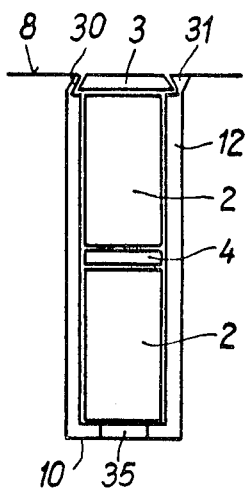

In the embodiment according to FIGS. 11 and 12, the laminations in two large partial stacks 32 and 33 are designed each with two-sided side ducts 12 and aerodynamically favorable openings 30 and 31 toward the air gap 8. In the center of the stack 5 and on its two end faces are arranged smaller partial stacks 34 which have slots for fastening conductors 2 and slot wedge 3 corresponding to their dimensions. On the slot floor 9 of these otherwise normal slots are provided in the center recesses 35 of a greater slot width, which thus form likewise within the partial stacks 34 an axially extending cooling channel. The axial cooling channel 15 on the slot bottom extends thus from one end face of the stack 5 to the other end face and opens on both sides into the adjacent radial cooling channels 6.

While the form of an electric machine herein described constitutes preferred embodiments of the invention, it is to be understood that the invention is not limited to these precise forms of assembly, and that a variety of changes may be made therein without departing from the scope of the invention.

What is claimed is:

1. In a bundle of laminations for an electric machine, containing:
   a plurality of stacks of laminations arranged in series in an axial direction;
   at least two radial cooling channels arranged between said stacks and each extending in radial direction, said radial directions being arranged perpendicularly to said axial direction;
   a plurality of slots extending along the surface of said bundle of laminations, each slot having two elongated lateral edges and a slot floor;
   at least one electric conductor of a winding arranged in each of said slots;
   the improvement comprising:
   in each stack between two radial cooling channels a first group of series arranged laminations containing a first portion of one of said slots, the width of said first slot portion being greater than the width of said conductor arranged therein, said conductor and at least one lateral edge of said slot portion thereby forming a side duct for conducting a cooling medium therethrough; and
   a recess at the floor of said first slot portion, said recess extending at least over a portion of said slot width and up to said one lateral edge, thereby forming a cooling channel which extends in an axial direction and opens at least on one side into one of said radial cooling channels.

2. The improvement of claim 1, wherein in said slot is arranged a plurality of conductors and at least one shim, wherein said conductors and said shim are held by a slot wedge, and wherein in said first group the depth of said recess is greater than the combined depth of said conductors, said shim and said slot wedge.

3. The improvement of claim 1, wherein in said first group of series arranged laminations one side of said conductor and said one lateral edge of said slot portion form said side duct, and wherein the other side of said conductor bears on the other lateral edge of said slot portion.

4. The improvement of claim 1, wherein in each stack arranged between two of said radial cooling channels, a plurality of said first groups of series arranged laminations having slot portions of said greater slot width are packed alternately reversibly.

5. The improvement of claim 2, wherein a second group of laminations arranged in series is provided in said stack between said two radial cooling channels, said second group containing a second portion of said slot whose slot width corresponds to the width of said conductor and whose slot depth corresponds to the combined depth of said conductors, said shim and said slot wedge.

6. The improvement of claim 2, wherein a another group of laminations arranged in series is provided in said stack between said two radial cooling channels, said other group containing another portion of said slot whose slot width corresponds to the width of said conductors, and wherein the floor of said other slot portion contains said recess having a slot depth which is greater than the combined depth of said conductors, said shim and said slot wedge.

7. The improvement of claim 2, wherein said slot wedges have release mechanisms in the range of said laminations with said greater slot width on a side on which the conductor does not bear on the lateral edge of said slot.

8. The improvement of claim 5, wherein said second group of laminations is arranged in the center of said stack.

9. The improvement of claim 2, wherein another group of laminations arranged in series is provided in said stack between said two radial cooling channels, said other group containing another portion of said slot, the width of said other slot portion being greater than the width of said conductor arranged therein, the lateral edges of said slot portion and said conductor thereby forming said side duct on each side of said conductor, and wherein said recess is provided at the floor of said other slot portion, said recess having a slot depth which is greater than the combined depths of said conductors, said shim and said slot wedge, and said recess extending over the entire slot width and up to both lateral edges of said slot portion.

10. The improvement of claim 9, wherein said other slot portion has aerodynamically designed openings arranged next to said slot wedge and leading into the air gap of said machine.

11. The improvement of claim 5 or 6, wherein an additional group of laminations arranged in series is provided laterally to the last mentioned group in said stack between said two radial cooling channels, said additional group containing another portion of said slot, the width of the last mentioned slot portion being greater than the width of said conductor arranged therein, the lateral edges of said slot portion and said conductor thereby forming a side duct on each side of said conductor, and wherein said recess is provided at the floor of said slot portion, said recess having a slot depth which is greater than the combined depths of said conductors, said shim and said slot wedge, and said recess extending over the entire slot width and up to said lateral edges.

12. In an electric machine having a bundle of laminations, said bundle containing:
   a plurality of stacks of laminations arranged in series in an axial direction;
   at least two radial cooling channels arranged between said stacks and each extending in radial direction, said radial directions being arranged perpendicularly to said axial direction;
   a plurality of slots extending along the surface of said bundle of laminations, each slot having two elongated lateral edges and a slot floor;
   at least one electric conductor of a winding arranged in each of said slots;
   the improvement comprising:
   in each stack between two radial cooling channels a first group of series arranged laminations containing a first portion of one of said slots, the width of said first slot portion being greater than the width of said conductor arranged therein, said conductor and at least one lateral edge of said slot portion thereby forming a side duct for conducting a cooling medium therethrough; and a recess at the floor of said first slot portion, said recess extending at least over a portion of said slot width and up to said one lateral edge, thereby forming a cooling channel which extends in an axial direction and opens at least on one side into one of said radial cooling channels.

* * * * *